(12) United States Patent
Shoval et al.

(10) Patent No.: US 7,949,125 B2
(45) Date of Patent: May 24, 2011

(54) METHOD AND APPARATUS FOR TRANSMITTING SIGNALING TONES OVER A PACKET SWITCHED NETWORK

(75) Inventors: Eli Shoval, Rosh Ha'ayin (IL); Mark Raifel, Ra'anana (IL); Leon Bialik, Tel Aviv (IL)

(73) Assignee: Audiocodes Ltd, Lod (IL)

( * ) Notice: Subject to any disclaimer, the term of this patent is extended or adjusted under 35 U.S.C. 154(b) by 0 days.

(21) Appl. No.: 12/585,771

(22) Filed: Sep. 24, 2009

(65) Prior Publication Data

US 2010/0020962 A1    Jan. 28, 2010

Related U.S. Application Data

(63) Continuation of application No. 10/122,077, filed on Apr. 15, 2002, now abandoned.

(51) Int. Cl.
*H04M 1/00* (2006.01)
(52) U.S. Cl. .................... 379/399.01; 379/386
(58) Field of Classification Search .............. 379/386, 379/399.01
See application file for complete search history.

(56) References Cited

U.S. PATENT DOCUMENTS

| | | | |
|---|---|---|---|
| 4,398,153 A * | 8/1983 | Rittenbach | 327/119 |
| 5,666,357 A | 9/1997 | Jangi | |
| 5,889,851 A | 3/1999 | Hsieh | |
| 6,226,303 B1 | 5/2001 | Levens et al. | |
| 6,298,055 B1 | 10/2001 | Wildfeuer | |
| 6,396,851 B1 | 5/2002 | Levens et al. | |
| 6,650,662 B1 | 11/2003 | Arnaud et al. | |
| 2001/0021040 A1 | 9/2001 | Chida et al. | |
| 2001/0030958 A1 | 10/2001 | Kichise | |
| 2002/0154760 A1 | 10/2002 | Branden | |

FOREIGN PATENT DOCUMENTS

| | | |
|---|---|---|
| EP | 0946034 | 9/1999 |
| JP | 2001/251421 | 9/2001 |
| WO | WO 01/13586 | 2/2001 |
| WO | WO 01/28256 | 4/2001 |

OTHER PUBLICATIONS

McLoughlin, Mike and O'Neil, John; Adapting Voice for ATM Networks; An ALL2 Tutorial; 1997; General DataComm.
European Search Report of EP 03 71 7503 dated May 19, 2005.

\* cited by examiner

*Primary Examiner* — Walter F Briney, III
(74) *Attorney, Agent, or Firm* — Eitan Mehulal Law Group (57) ABSTRACT

As part of a system and method for transmitting a signaling tone over a packet switched data (or other communication) network, an audio encoder may have a speech encoding unit and a tone distorter. The tone distorter may distort one or more components of a signaling tone within an audio signal and the speech encoding unit may encode speech and the distorted signaling tone within the audio signal. A control signal may be sent to a tone generator to reproduce the distorted tone.

22 Claims, 4 Drawing Sheets

METHOD AND APPARATUS FOR TRANSMITTING SIGNALING TONES OVER A PACKET SWITCHED NETWORK

PRIOR APPLICATION DATA

This application is a continuation of U.S. patent application Ser. No. 10/122,077, filed on Apr. 15, 2002 now abandoned, which is incorporated herein by reference in its entirety.

FIELD OF THE INVENTION

The present invention relates generally to the field of tone signaling. More specifically, the present invention relates to the field of transmitting tone signals over a packet switched data network.

BACKGROUND OF THE INVENTION

Tone signaling techniques such as "Dual Tone Multi Frequency" ("DTMF") signaling are known and have been in use with telephone networks for at least the past twenty years. The advent and expanded use of packet switched telephony has presented certain barriers to the use of tone signals. In certain situations, encoders used to encode human speech may alter the frequency composition of a tone to the extent that that tone is not recognized by the device to be signaled. In another case, an encoder may alter the tone such that the device to be signaled mistakes the tone for another or may mistake the tone for two or more tones.

DTMF Relays have been introduced in order to overcome this problem. The DTMF Relay is composed of a DTMF tone Detector and a DTMF tone Generator. The Detector monitors the incoming audio signal and upon detection of a signaling tone produces a control signal instructing the Generator in the receiving station to produce the signaling tone. Unfortunately, the detection of a signaling tone is time consuming and the relay path is sometimes delayed with respect to the voice path such that the signaling tone is detected twice at the receiving station. This is known as double-digit detection. It has been suggested to mute the voice path after the signaling tone is detected, however due to the time intensive nature of the detection process the muting of the voice path is delayed and some residual DTMF signaling is carried by the voice path to the receiving station causing double-digit detection.

SUMMARY OF THE INVENTION

As part of the present invention, there may be a frequency estimator which may analyze an audio signal, looking for a frequency component of a signaling tone, and may provide information relating to a suspected signaling tone's frequency component to a tone distorter within a substantially short period of time. A signaling tone may either be a single tone, or a combination of two or more tones. The tone distorter may modify the frequency composition of a suspected signaling tone within the audio signal. The tone distorter's modification of the frequency composition of a suspected signaling tone may render the tone unrecognizable to a tone detector functionally associated with a device the signaling tone was intended to signal.

According to some aspects of the present invention the tone distorter's modification of the frequency composition of a suspected signaling to tone may have minimal distortion impact on speech signals.

As part of the present invention, there is a tone detector which may confirm whether a suspected signaling tone, detected by the frequency estimator, is actually present in the audio signal, and thus is a true signaling tone. In response to detecting a true signaling tone, the tone detector may instruct a tone generator to produce the detected signaling tone.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Unless specifically stated otherwise, as apparent from the following discussions, it is appreciated that throughout the specification discussion utilizing terms such as "tone", "signaling tone", "level", "frequency" or "frequency component" or the like, may refer to one or more unit or units of the above components and elements.

As part of the present invention, there may be a frequency estimator which may analyze an audio signal, looking for a frequency component of a signaling tone, and may provide information relating to a suspected signaling tone's frequency component to a tone distorter. The tone distorter may modify the frequency composition of a suspected signaling tone within the audio signal A tone detector may determine whether a signaling tone is actually present in the audio signal, and in response to a signaling tone's presence, may instruct a tone generator in the receiving station to produce the detected signaling tone.

A frequency estimator may be used in combination with a tone detector so that a signaling tone may be detected within sufficient time to distort the tone. Frequency estimators may be less accurate and may produce more false detects than tone detectors. However, a frequency estimator may have a quicker response time than a tone detector, and thus may detect a suspected signaling tone within a sufficient period of time in order to distort the frequency composition of the suspected signaling tone.

In the event the frequency estimator has a false detection of a signaling tone, that is, it detects a suspected signaling tone when one is not truly present in the audio signal, the tone distorter may be signaled to distort the falsely detected tone. As part of the present invention, the tone distorter may distort the frequency composition of an audio signal in which a signaling tone was falsely detected such that speech within the audio signal remains perceivable. In a preferred embodiment of the present invention, the tone distorter may distort the frequency composition of an audio signal in which a signaling tone was falsely detected such that the quality of speech within the audio signal is only slightly diminished.

Figure 1:
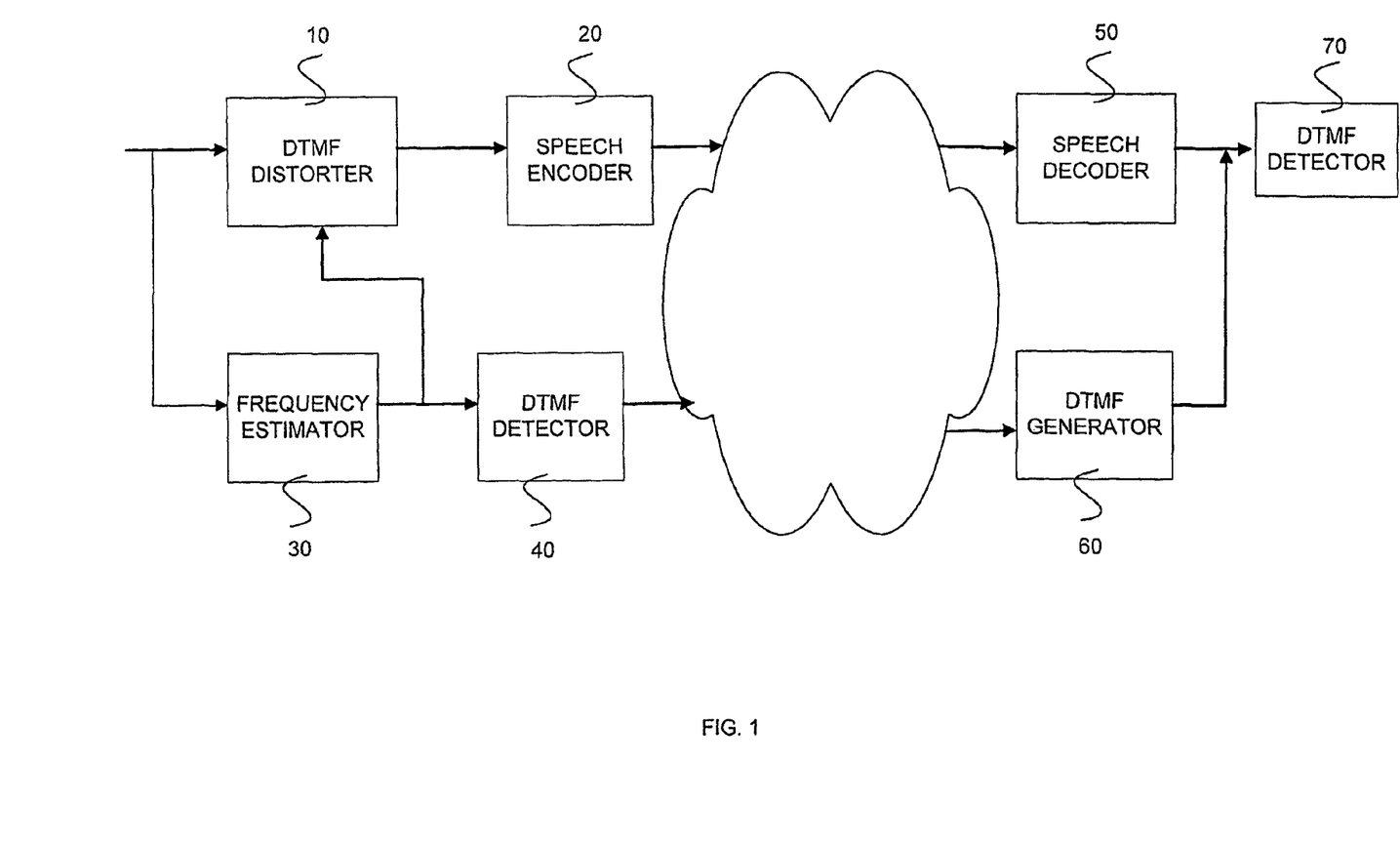
FIG. 1 shows a block diagram of signaling tone transmission system according to the present invention.

Turning now to FIG. 1, there is shown a block diagram of a signaling tone transmission system according to the present invention. An audio signal which may contain a signaling tone may enter the system from the left side of FIG. 1. The audio signal with a signaling tone may have been generated in anyone of a number of devices, including but not limited to a telephone with a touch tone dialer. The signal may be received by a tone distorter 10 and a frequency estimator 30 which may be configured to analyze the frequency composition of the audio signal, specifically looking for one or more frequency components correlated to one or more signaling tones. A speech encoder 20 may encode the audio signal and transmit data packets over a communications network to decoder 50, where the packets may be decoded and the audio signal reconstructed. The communications network may be configured to carry data using either ATM, IP, TCP, UDP, or RTP protocols, any combination thereof and any other suitable methodology.

In the event frequency estimator 30 detects a signaling tone (whether or not one is truly present) in the audio signal, the frequency estimator 30 may produce and provide the distorter 10 with one or more frequency values and amplitudes of the suspected tone's frequency components. The distorter 10 may distort the suspected tone in the audio signal such that the suspected tone would not be recognizable to a signaling tone detector 70 forming part of decoder 50. Since the frequency estimator 30 may err in its detection, the distortion is of a type which minimally affects the speech quality. The signaling detector 70 may be included in the signaling tone transmission system according to some embodiments of the present invention, however other embodiments of the signaling tone transmission system of the present invention may be practiced without the signaling tone detector 70.

Signaling tone detector 40 may also receive the undistorted audio signal and may detect a tone. Tone detectors 40 are well known and may be slower in detecting a tone within an audio signal than a frequency estimator 30. However, tone detectors, such as the DTMF detector 40 in FIG. 1, are more precise in determining the presence or absence of a signaling tone in an audio signal than a frequency estimator 30. If the tone detector 40 detects a tone in the audio signal, it may send a control signal to a tone generator 60 instructing the tone generator to produce the detected tone. The tone generator 60 may be coupled to the decoder 50, such that the output of the generator 60 is overlaid upon the audio signal output from the decoder 50.

Speech encoder 20 (FIG. 1) may convert the time domain signal into data packets suitable for transport over a data communications network. Speech encoder 20 may then transmit the data packets to a destination address on the network. Speech decoder 50 at the destination may convert the data packets transmitted by the encoder 20 back into a time domain audio signal having a distorted tone which is not recognizable by the device 70 the tone was intended to signal.

Figure 2:
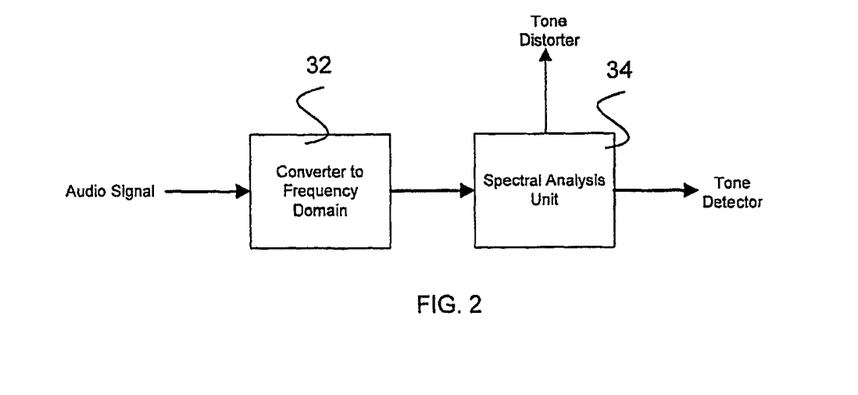
FIG. 2 shows a block diagram of a frequency estimator according to the present invention.

The frequency estimator may be constructed using one of a number of methodologies, an example of which is shown in FIG. 2. The signal may go through a time-to-frequency-domain converter 32 such as a Fourier transform engine, a linear predictive coefficient generator, a cosine transform engine, etc. A set of filters, or filter banks, each tuned to a specific frequency associated with the tones of interest, may also be used. The level of the output of each filter may indicate the level or strength of the frequency component to which the filter is tuned within the audio signal. The output of the converter 32 may be analyzed by a spectral analysis unit 34 which may attempt to identify frequency components in the audio signal whose presence would indicate that a signaling tone is also present. Since each signaling tone has one or more frequency components associated with it, a strong or semi-strong presence of a tone's frequency component may cause the spectral analysis unit 34 to determine that the related tone is present in the audio signal. In the event that the frequency estimator 30 determines that a tone may be present in the audio signal, the frequency estimator 30 may send a signal to the distorter 10 indicating the frequency or frequencies and amplitude of the frequency components of the tone suspected to be present in the audio signal.

Figure 3A:
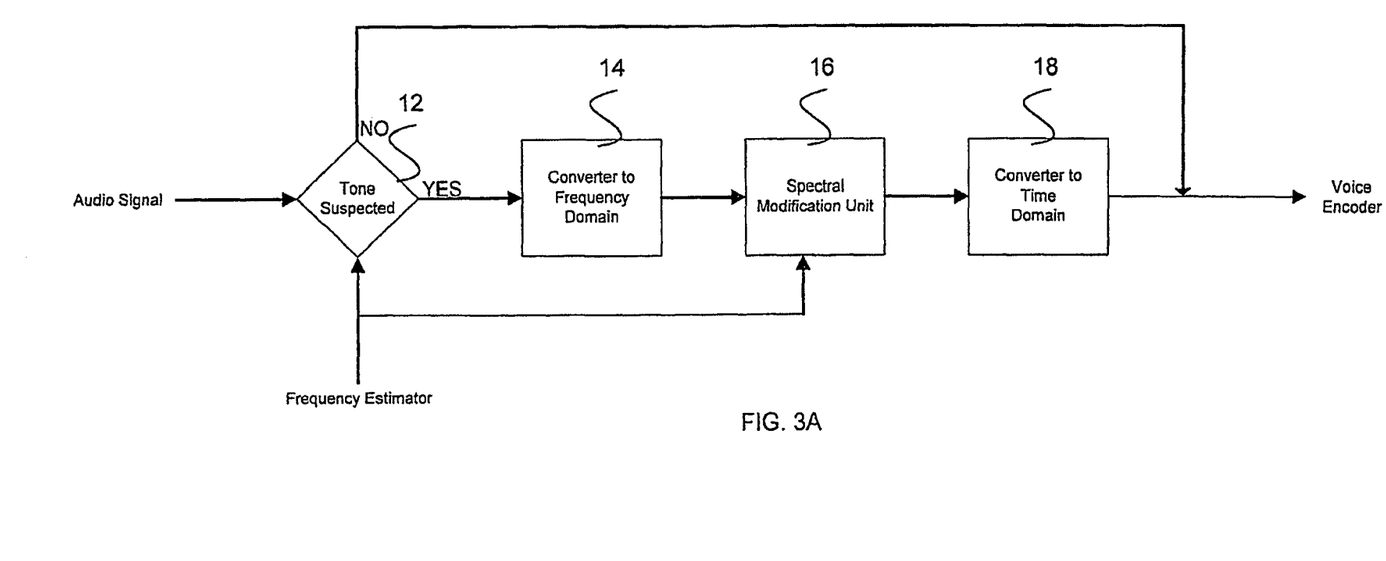
FIG. 3A shows a block diagram of one embodiment of a tone distorter according to the present invention.

Turning now to FIG. 3A, there is shown a block diagram of one embodiment of a tone distorter 10 according to the present invention. The distorter 10 may contain a switch or relay 12 which by default may send an incoming source audio signal on a bypass path around the other elements of the distorter. In the event that the frequency estimator 30 provides the distorter 10 with an indication that the audio signal may have a tone therein, the relay 12 may trigger such that the incoming audio signal is passed to a time-to-frequency-domain converter 14, a spectral modification unit 16, and to a frequency-to-time-domain-converter 18. Time-to-frequency-domain converters 14 are known, and may include but are not limited to a Fourier transform engine, a linear predictive coefficient generator, a cosine transform engine, or a filter bank. The output of the time-to-frequency-domain converter 14 may be referred to as a spectral representation of the audio signal.

Figure 4A:
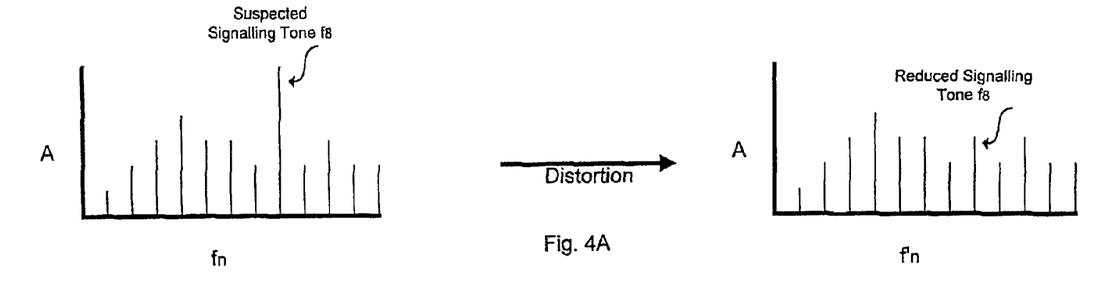
FIG. 4A shows a frequency diagram of a frequency component of a suspected tone being reduced.

The spectral modification unit 16 may receive from the frequency estimator 30 the frequency and amplitude of the suspected tone's frequency component, and may modify or distort the frequency component associated with the suspected tone such that the tone would not be recognized by the device the tone is intended to signal. Distortion of a suspected signaling tone's frequency component may be accomplished by reducing the amplitude of its associated frequency component or components, an example of which is shown in FIG. 4A. FIG. 4A (on the left side) shows $f_8$, the suspected signaling tone frequency component, as having a the highest amplitude amongst all the other frequency component. While, FIG. 4A (on the right side) shows $f_8$, the suspected signaling tone frequency component, having a lower amplitude after undergoing distortion.

Figure 4B:
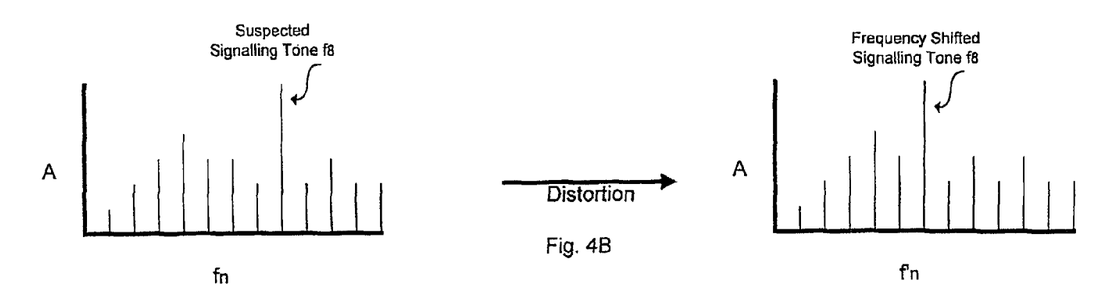
FIG. 4B shows a frequency diagram of a frequency component of a suspected tone being shifted in frequency.

Distortion of a suspected signaling tone's frequency component may also be accomplished by shifting either up or down the frequency of the suspected tone's frequency components. For example, if a suspected signaling tone could have a frequency component at $f_8$ (correlated to 900 Hz for example), the spectral modification unit may shift the frequency component down as shown in FIG. 4B. FIG. 4B (on the right side) shows $f_8$, the suspected signaling tone frequency component shifted downward two discrete frequency values to $f_6$. In the example shown in FIG. 4B, $f_8$ and $f_6$ are swapped. However, in another example, $f_8$ may simply replace $f_6$.

Figure 4C:
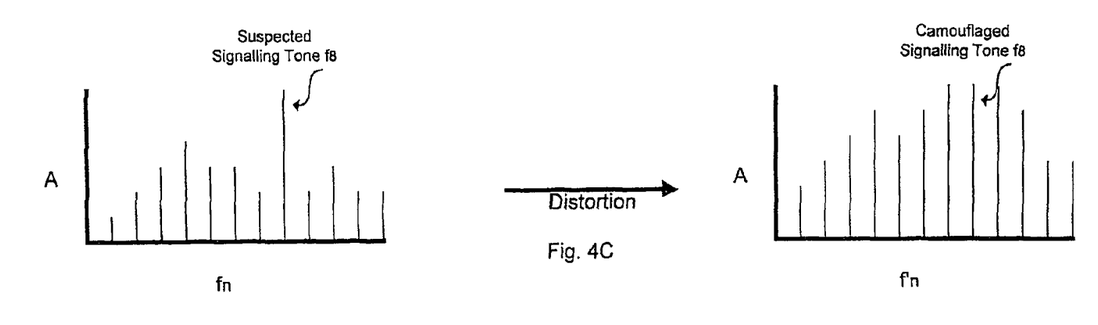
FIG. 4C shows a frequency diagram of a frequency component of a suspected tone being camouflaged between adjacent components.

The spectral modification unit may also introduce noise to or amplify frequency components in frequency bands adjacent to the frequency of the frequency component of the suspected tone, an example of which is shown in FIG. 4C. FIG. 4C shows the frequency components surrounding $f_8$ amplified such that $f_8$ is no longer the dominate frequency component.

In cases where the tone signal is comprised of two or more tones (for example DTMF), all the components may be distorted or some of the components may be distorted or only one of the components may be distorted. Usually, it is better to distort the lower amplitude component.

These and other spectral modification techniques may be used to alter the spectral composition of the suspected tone such that it would not be recognized as a signaling tone by the device the tone was intended to signal. A frequency-to-time-domain converter 18 (FIG. 3A) may convert the modified spectral representation of the audio signal back into a time domain signal.

Figure 3B:
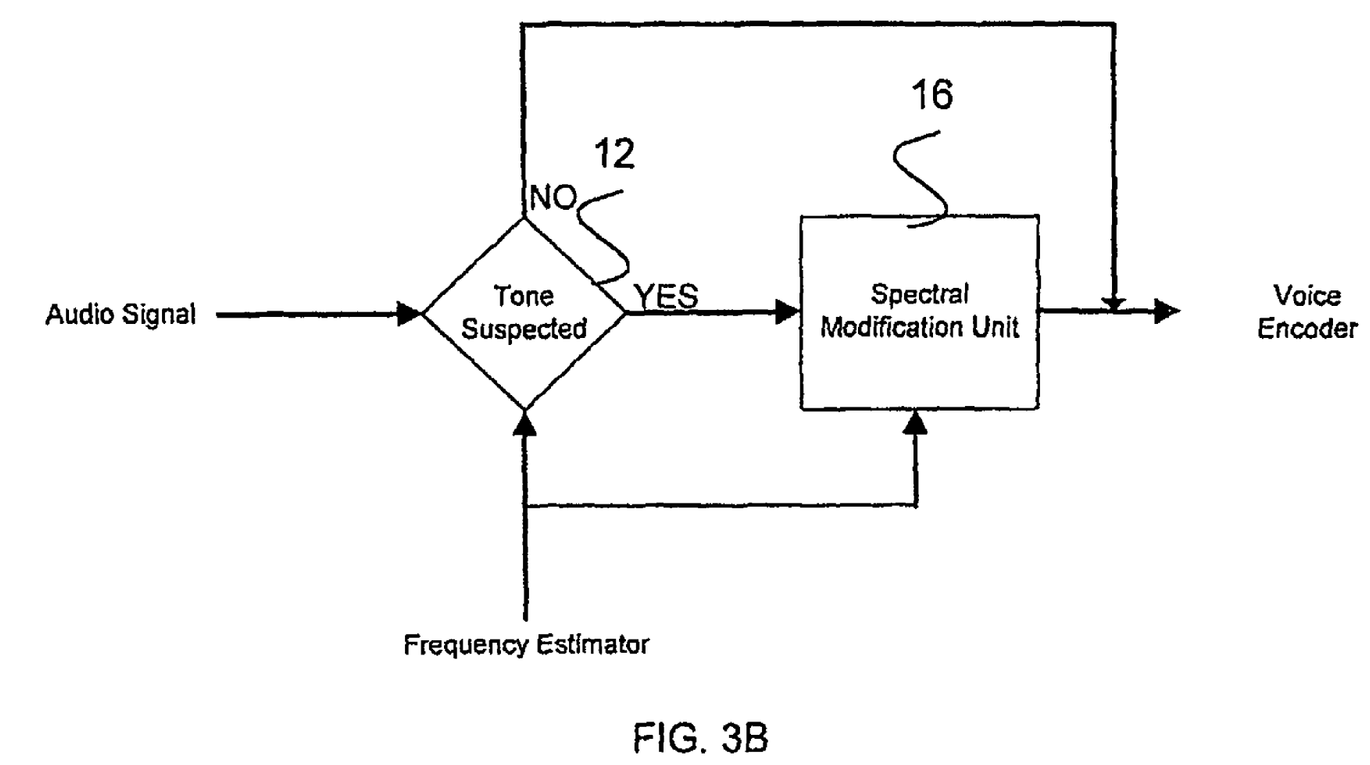
FIG. 3B shows a block diagram of a second embodiment of a tone distorter according to the present invention.

FIG. 3B shows an alternate embodiment for a tone distorter 10 according to the present invention. The distorter 10 of FIG. 3B may only contain a spectral modification unit 16 which may alter the frequency composition of a signal containing a signaling tone without first converting the signal into the frequency domain. As part of the embodiment of FIG. 3B, the spectral modification unit 16 may be a filter, an up or down frequency shifter, or any other device with a suitable frequency domain transform characteristic or frequency response.

An example of how other tone distorters, such as a DTMF tone distorter, may be implemented is hereby provided: In order to achieve a sufficient distortion such that a DTMF signal will not be recognized as a valid DTMF signal by a standard DTMF detector, the characteristics of DTMF detectors, as defined by the standard TIA-464B, may be exploited. For example, the DTMF standard has definitions such as Twist—the power ratio between the high frequency and low frequency components in a DTMF signal is required to be between +4 dB to −8 dB in order for the DTMF signal to be accepted or recognized; Power limits per component—the component power must be between 0 to −25 dB in order to be accepted; and Frequency deviation—frequency deviation of components must be less than 1.5% in order to be accepted.

Apart from the TIA-464B standard, there are other characteristics that are common to all DTMF detectors and which may be exploited to fool a DTMF detector: Power stationarity—in order to discriminate between DTMF and speech signals, DTMF detectors require that the short term signal power will be constant in order that the signal will be accepted as a DTMF signal; Power concentration—in order to discriminate between DTMF and speech signals, DTMF detectors require that the power spectrum will be concentrated around the DTMF frequencies in order that the signal will be accepted as a DTMF signal.

Taking into account the above listed characteristics or requirements of a DTMF detector, DTMF distorters may be designed according to one or more of the following parameters:

Twist distorter—This distorter may attenuate the frequency component with the lower level by a minimal attenuation such that the twist will be out of the allowed DTMF range. It may use a notch filter around the frequency component in order that only the DTMF component will be attenuated. The notch filter may either be a Finite Impulse Response ("FIR") filter or an Infinite Impulse Response ("IIR") filter. An IIR filter with the following transfer function may be used:

$$H(z) = \frac{z^2 - 2\cos\theta \cdot z + 1}{z^2 - 2r\cos\theta \cdot z + r^2}$$

Z denotes the complex variable of the Z transform, the parameter Theta controls the center frequency of the Notch filter and the parameter r controls the attenuation of the tone such that the twist will be outside the accepted range. An attenuation of 15 dB applied to the frequency component may be sufficient to ensure that the twist is outside the accepted range. Due to the monotonicity of the frequency response of the filter below and above the nominal frequency, the attenuation at the nominal frequency ±1.5% may be even higher than 15 dB.

The following is a table that describes the design of a Twist Distorter using 1 Notch Filter (for the weaker of the 2 DTMF components estimated by the frequency estimator) out of a set of 8 possible Notch Filters according to the 8 nominal DTMF frequencies The Nominal frequency $f_0$ is the center of the Notch. $f_0$ is used to compute the parameter Theta in the difference equation of the filter. Radius value r is the distance of the poles of the filter from the origin, r is used in the difference equation of the filter to control the attenuation at the notch frequency.

| Nominal Frequency | R | Attenuation at Freq −2.5% | Attenuation at Freq +2.5% | Frequency at −3 db | | Delta (Hz) |
|---|---|---|---|---|---|---|
| | | | | Low Freq | High Freq | |
| 697 Hz | 0.92 | −15 db | −15 db | 605 | 788 | 183 |
| 770 Hz | 0.91 | −15 db | −15 db | 668 | 870 | 202 |
| 852 Hz | 0.90 | −15 db | −15 db | 740 | 965 | 225 |
| 941 Hz | 0.89 | −15 db | −15 db | 820 | 1060 | 240 |
| 1209 Hz | 0.85 | −15 db | −15 db | 1050 | 1365 | 315 |
| 1336 Hz | 0.84 | −15 db | −15 db | 1170 | 1500 | 330 |
| 1477 Hz | 0.82 | −15 db | −15 db | 1295 | 1660 | 365 |
| 1633 Hz | 0.79 | −15 db | −15 db | 1428 | 1840 | 412 |

The attenuation in the nominal frequency ±2.5% is shown for each frequency. The r value may be computed such that the attenuation will be at least 15 dB. This may ensure that the filter will cause the twist to be illegal for detection, taking into account the bandwidth of a reasonable detector. In order to show that the distortion is minimal for a speech signal (when the frequency estimator falsely detected the signal as DTMF) we show the low and high frequencies where the attenuation is 3 dB and compute the band Delta that represents the band that is substantially attenuated. The band delta is at worst case 412 Hz out of 3 KHz voice band which is approximately 13%.

The notch filter may be implemented in the time domain using the following difference equation:

$$y[n]=2r\cos\theta \cdot y[n-1]-r^2 y[n-2]+x[n]-2\cos\theta \cdot x[n-1]+x[n-2]$$

The parameters r and Theta in the table are used according to the weaker suspected DTMF frequency component that was estimated by the frequency estimator.

Where:

$x[n]$ is the value of the $n^{th}$ input sample to the filter $y[n]$ is the value of the $n^{th}$ output sample of the filter.

Frequency modulation distorter—This distorter may shift the frequency components by multiplying the signal by a sine or cosine modulator of a fixed modulating frequency. The result of the modulation is a sum of the signal that is shifted once forward in frequency and once backward in frequency by the size of the modulating frequency. The modulating frequency may be such that it will cause at least one DTMF component to have a frequency deviation larger than 3.5% which should cause the tone to be rejected by a tone detector 70.

$$y[n]=x[n]\cdot\cos(w_1 n)$$

Where:

$x[n]$ is the value of the $n^{th}$ value of a sample of the audio signal $y[n]$ is the value of the modulator's n'th output sample $$w_1=2\pi f_1/f_s$$

$f_1$ is the frequency offset, $f_s$ is the sampling frequency.

Frequency shift distorter—This distorter shifts the frequency components by subtracting the product of the signal by a cosine modulator of a fixed modulating frequency (sine/cosine modulators multiplies the signal by a sine/cosine wave with a fixed frequency, the result will be a shift of the original signal spectrum by the frequency of the modulator) and the product of the Hilbert transformed signal by a sine modulator. The result is a shift forward in frequency by the size of the modulating frequency. The modulating frequency may be such that it will cause at least one component to have a frequency deviation larger than 3.5% so it will be rejected.

$$y[n]=x[n]\cdot\cos(w_1 n)-\text{Hilbert}\{x[n]\}\cdot\sin(w_1 n)$$

Where: Hilbert$\{x[n]\}$ denotes the Hilbert transform of the signal x[n].

The Hilbert transform can be implemented using an appropriate allpass FIR filter.

Power spectrum concentration distorter—This distorter lowers the relative power spectrum concentration at the DTMF components by adding harmonic components to the original frequency components. This may be done by applying a non-linear transformation to the signal. An absolute value function may be used as the non-linear transformation.

$$y[n]=|x[n]|$$

Other non linear transformations can also be used. For example:

$$y[n]=x^2[n]$$

Where:

$x[n]$ is the $n^{th}$ sample of the audio signal $y[n]$ is the n'th sample of the distorter's output The results of these transformations may be that the spectrum of the transformed signal will contain harmonics (integer multiples) of the spectrum components of the original signal. This may cause the detector 70 to find that the spectrum is less concentrated in the DTMF frequencies (because some of it will be concentrated in multiples of the DTMF frequencies) and therefore the detector 70 will reject the signal as non-detected.

The spectrum concentration distorter may amplify one or more frequency components in the vicinity of signaling tone component. The effect of doing so may be to hide the signaling tone inside the audio signal, thereby making the tone unrecognizable to a tone detector.

The frequency composition of an audio signal along with a signaling tone contained therein may be arbitrarily altered in the frequency domain. The use of time-to-frequency domain transforms is well known. An audio signal containing a signaling tone may be sampled and the samples partitioned into either overlapping or non-overlapping segments or frames of samples. Each segment may be transformed into a frequency domain or spectral representation of the segment. Specific frequency components within each frame may be either increased, decreased, moved or otherwise altered, and the altered spectral representation may be transformed back into the time domain. Each of the distortion methods described above, along with any others which may be applicable to the present invention, may be implemented in the frequency domain using time-to-frequency domain transforms.

In an embodiment of the present invention, the distorter 10 may have limited effect on the speech represented by the audio signal. In the event the frequency estimator 30 signals the presence of a suspected signaling tone, when in fact a true signaling tone is not present, the tone distorter's modification of the audio signal may not severely reduce the quality of the speech within the audio signal. That is, the distortion produced by the tone distorter 10 may have negligible effect on the speech component of the audio signal, such that the speech signal's may be intelligible to a listener. This may be accomplished by performing only limited spectral modification using one of the above listed techniques.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A method comprising:
   determining whether an audio signal comprises a frequency component at a frequency used to provide a signaling tone;
   affecting the determined frequency component responsive substantially only to determining its presence in the audio signal so that the determined frequency component is unrecognizable as a tone signal by a tone detector;
   estimating that the signaling tone comprises a plurality of frequency components;
   selectively distorting at least one of the plurality of frequency components while maintaining undistorted at least one other of the plurality of frequency components, wherein selectively distorting comprises: selectively distorting the frequency component having an amplitude value which is lower than amplitude values of the other of the plurality of frequency components.

2. The method of claim 1, wherein affecting the determined frequency component comprises:
   shifting the determined frequency component.

3. The method of claim 1, wherein affecting the determined frequency component comprises:
   changing a magnitude of the determined frequency component.

4. The method of claim 1, wherein affecting the determined frequency component comprises:
   camouflaging the determined frequency component.

5. The method of claim 1, wherein affecting the determined frequency component comprises:
   changing a level of one or more frequency components near the determined frequency component, to affect the determined frequency component.

6. The method of claim 1, further comprising:
   transmitting to a destination the audio signal with the affected frequency component.

7. The method of claim 6, further comprising:
   prior to transmitting the audio signal to the destination, encoding the audio signal.

8. The method of claim 7, further comprising:
   determining whether the audio signal actually comprises a tone signal; and
   if it is determined that the audio signal actually comprises the tone signal, then transmitting to a remote tone generator a control signal instructing the remote tone generator to generate the determined tone signal.

9. The method of claim 1, comprising:
   in the frequency domain, detecting within an audio signal one or more frequency components at a frequency used to provide a signaling tone;
   modifying each of the detected at least one frequency components responsive substantially only to detecting its presence in the audio signal,
   wherein different modification parameters are used for frequency components at frequencies used to provide different signaling tones.

10. The method of claim 9, comprising:
    encoding the audio signal with the altered frequency components.

11. The method of claim 1,
    wherein the determining comprises: detecting a suspected signaling tone in the audio signal, irrespective of whether or not the suspected signaling tone is actually comprised in the audio signal; and producing a first value representing a frequency of the suspected signaling tone, and a second value representing an amplitude of the suspected signaling tone;
    wherein the affecting comprises: distorting the suspected signaling tone in the audio signal based on said first value and said second value, irrespective of whether or not the suspected signaling tone is actually comprised in the audio signal.

12. The method of claim 9, wherein determining whether the audio signal comprises a frequency component at a frequency used to provide a signaling tone is performed within a time period which is shorter than a time period required for determining whether the audio signal actually comprises the tone signal.

13. The method of claim 1, wherein affecting the determined frequency component comprises:
    twisting the frequency component using minimal attenuation to generate a twist outside of an allowed Dual Tone Multi Frequency (DTMF) range.

14. The method of claim 1, wherein affecting the determined frequency component comprises:
    performing a non-linear transformation to produce a transformed signal comprising integer multiples of spectrum components of the determined frequency component.

15. A tone transmission apparatus comprising:
    a frequency estimator to detect whether an audio signal comprises a frequency component at a frequency used to provide a signaling tone; and
    a tone distorter to modify the detected frequency component, responsive substantially only to detecting its presence in the audio signal so that the detected frequency component is unrecognizable as a tone signal by a tone detector;
    wherein the frequency estimator is to estimate that the signaling tone comprises a plurality of frequency components;
    wherein the tone distorter is to selectively distort at least one of the plurality of frequency components while maintaining undistorted at least one other of the plurality of frequency components, by distorting the frequency component having an amplitude value which is lower than amplitude values of the other of the plurality of frequency components.

16. The tone transmission apparatus of claim 15, wherein the tone distorter is selected from the group consisting of: a twist distorter, a frequency modulation distorter, a frequency shift distorter, and a power concentration distorter.

17. The tone transmission apparatus of claim 16, further comprising:
    an encoder to convert the audio signal with the distorted frequency component into one or more data packets.

18. The tone transmission apparatus of claim 17, further comprising:
    a tone detection unit to detect a signaling tone in the audio signal, and to produce a control signal instructing a remote tone generator to generate the detected signaling tone.

19. The tone transmission apparatus of claim 18, wherein the tone distorter is to modify the detected frequency component based on a frequency value of the detected frequency component and an amplitude value of the detected frequency component.

20. The tone transmission apparatus of claim 15, wherein the frequency estimator is selected from the group consisting of: a time-to frequency-domain converter, a Fourier transform engine, a linear predictive coefficient generator, and a cosine transform engine.

21. The tone transmission apparatus of claim 17, wherein the encoder is to transmit the audio signal over a data communications network, and wherein the data communications network is selected from the group consisting of: an ATM network, a TCP protocol network, an IP network, a UDP network, and an RTP network.

22. The tone transmission apparatus of claim 15, wherein the tone distorter is to only minimally distort speech within the audio signal.

* * * * *